United States Patent [19]

Teates

[11] 4,067,504
[45] Jan. 10, 1978

[54] COMPOST MACHINE

[76] Inventor: N. Grove Teates, 2707 Weisman Road, Wheaton, Md. 20902

[21] Appl. No.: 737,102

[22] Filed: Oct. 29, 1976

[51] Int. Cl.$^2$ .............................................. A01D 55/00
[52] U.S. Cl. ................................... 241/101.7; 56/194
[58] Field of Search .................. 56/12.7, 194, DIG. 1; 241/101.7, 277

[56] References Cited

U.S. PATENT DOCUMENTS

| | | | |
|---|---|---|---|
| 2,911,780 | 11/1959 | Brady | 56/192 |
| 3,241,300 | 3/1966 | Fell et al. | 56/DIG. 1 |
| 3,369,797 | 2/1968 | Cobey | 241/101.7 |
| 3,662,962 | 5/1972 | Cobey | 241/101.7 |
| 3,716,973 | 2/1973 | Kidd | 56/192 |

Primary Examiner—Gerald A. Dost
Attorney, Agent, or Firm—Witherspoon, Lane & Hargest

[57] ABSTRACT

Two embodiments, a towed embodiment and a self-propelled embodiment, of a compost machine for shredding, mixing and aerating decomposable and non-decomposable waste material deposited in strips on large sites are disclosed. Both embodiments of the compost machine of this invention include a frame-suspension member, a rotary member, a plurality of replaceable teeth carried by the rotary member, a folding protective shield system, a pair of hydraulic motors and a prime mover. In both embodiments the hydraulic motors are mounted inside the rotary member, one at each end and are driven by the prime mover through a shock-protective coupling arrangement. In addition to the aforementioned common structural elements, the towed embodiment of the compost machine includes a foldable tow-bar assembly and a pair of tired wheels, one mounted on each side of the frame; and the self-propelled embodiment of the compost machine includes in addition to the aforementioned common structural elements a pair of tracks, one mounted on each side of the frame, a conventional crawler undercarriage, a suspension propel system, a foldable operator cab and the controls. The towed embodiment of the compost machine of this invention can be readily loaded and transported, without disassembly, from site to site, on a conventional truck-trailer due to the fact that the tow bar assembly and the shields of the protective shield system are foldable and the wheels are vertically adjustable such that the wheels can be extended to raise the compost machine for loading and retracted above the bottom of the frame skids to secure the compost machine during transport. Similarly, the self-propelled embodiment can be readily loaded and transported without disassembly, from site to site on a conventional truck-trailer due to the fact that the shields of the protective shield system and the cab are foldable and the crawler units are vertically adjustable such that the crawler units can be extended to raise the compost machine for loading and retracted above the bottom of the frame skids to secure the compost machine during transport.

27 Claims, 6 Drawing Figures

COMPOST MACHINE

BACKGROUND OF THE INVENTION

This invention relates to the resource recovery in waste material by processing and combining decomposable waste materials found in refuse collection trash, agricultural waste, municipal waste, sewage sludge with non-decomposable materials found in the foregoing wastes in correct proportions for maximum aerobic decomposition of compostable materials; and more specifically, to composting machines that provide for large scale resource recovery of waste materials on an economically and ecologically sound basis.

Various different composting machines have been developed and are now in use. These prior art machines provide for the shredding, mixing and aerating of decomposable and non-decomposable material deposited on selected sites. Unfortunately, the composting machines now generally in use for large scale operation are very large vehicles that cannot readily be moved from place to place and are limited to, in some cases, specially prepared sites. That is, these prior composting machines are so large that they cannot be moved from one site to another site without being disassembled and require the use of a special large truck-trailer. Further, these large prior art composting machines are generally limited to either specially prepared sites or suffer low production rates on soft or muddy terrain due to lack of traction and poor floatation common in wheeled vehicles and generally are very costly to operate.

This invention provides composting machines that provide for large scale production even under poor terrain conditions. Further, the compost machines of this invention are relatively inexpensive to manufacture and operate and are readily transported from one location to another distant location by a conventional truck-trailer.

SUMMARY OF THE INVENTION

The embodiments of the invention are disclosed. The first embodiment of the compost machines of this invention is a towed vehicle that is designed to be towed by either a wheeled or tracked towing vehicle having a conventional or standard drawbar hitch. The second embodiment of the compost machines of this invention is a self-propelled tracked vehicle having a conventional crawler undercarriage.

The composting machine of the first embodiment of the invention includes a frame and the following frame supported members, a rotary drum, a fully off-set foldable tow bar, a folding protective shield system, and a pair of vertically adjusted rubber tired wheels.

The rotary member is provided with a plurality of replaceable type teeth and is driven by a pair of direct drive low speed hydraulic motors. The hydraulic motors are mounted inside the rotary member, one adjacent each end. Motor torque is supplied by the hydraulic motors through a shock-protective-coupling arrangement operatively connected to a prime mover mounted on the frame. The rotary member is rotated into and downwardly toward the ground thereby aiding the forward motion of the machine and rearward discharge of the processed material.

The towed compost machine can, due to the fact that the tow bar and the shields of the protective shield system are foldable and due to the adjustable height and kneeling feature provided by the vertically adjustable wheels, be easily loaded onto a standard truck-trailer. Therefore, as compared to the prior art composting machines, the towed compost machine embodiment of this invention is readily loaded onto a standard truck-trailer and transported from one location to another distant location and placed in operation in a minimum time with a minimum amount of effort and expense.

The second embodiment, the self-propelled embodiment, includes a frame and the following frame supported members, a rotary drum, a folding protective shield system, a pair of flexibly mounted vertically adjustable crawler undercarriages, and an operator cab with controls.

The rotary member is provided with a plurality of replaceable type teeth and is driven by a pair of direct drive low speed hydraulic motors. The hydraulic motors are mounted inside the rotary member, one adjacent each end. Motor torque is supplied by the hydraulic motors through a shock-protective-coupling arrangement operatively connected to a prime mover mounted on the frame. The rotary member is rotated into and downwardly toward the ground thereby aiding the forward motion of the machine and rearward discharge of the processed material.

Due to the fact that the shields of the protective shield system and the operator cab are foldable and due to the adjustable height and kneeling feature provided by the vertically adjustable crawler undercarriages, this self-propelled embodiment is also readily loaded onto a standard truck-trailer. In fact the self-propelled embodiment is more easily loaded onto a truck-trailer than the towed embodiment since the self-propelled embodiment can be driven onto the trailer under its own power by means of ramps or the like. Therefore, as compared to the large prior art composting machines, this second embodiment of the composting machine of this invention is also readily loaded onto a truck-trailer and transported from one location to another distant location in a minimum amount of time with a minimum amount of effort and expense.

Both embodiments of the compost machine of this invention provide for the shredding, mixing and aerating of a combination of decomposable and non-decomposable materials in correct proportions for large scale aerobic decomposition of waste materials and facilitate the processing of the mixed material for resource recovery in later separation or receiving of the resulting humus and non-decomposable items. Further, as mentioned, both embodiments are transportable by a standard truck-trailer. Therefore, the embodiment chosen by a given use of composting machines will in all probability depend primarily upon whether or not the user has on hand a suitable towing vehicle. The towed embodiment is obviously less expensive to produce; however, if a given user has to purchase both the towing vehicle and the composting machine, the self-propelled embodiment would be less costly than purchasing both the towing vehicle and the composting machine. Of course, other factors such as whether or not a towing vehicle is needed for other purposes and whether or not the compost machine is to be transported on a regular basis, the self-propelled embodiment being more easily loaded onto the trailer, will also influence which embodiment is chosen by a given user. This question of choice of one of the two embodiments is pointed out to emphasize that both embodiments are equally well suited for their intended purpose and that, therefore, factors other than the basic functioning of the two embodiments will generally influence which embodiment is chosen by a given user.

BRIEF DESCRIPTION OF THE DRAWING

A complete and full understanding of the operation and structural details of the composting machine of this invention can be obtained from the following detailed description of the invention when read in conjunction with the annexed drawings in which like parts in the various figures have like numerals and in which.

DETAILED DESCRIPTION OF THE INVENTION

Figure 1:
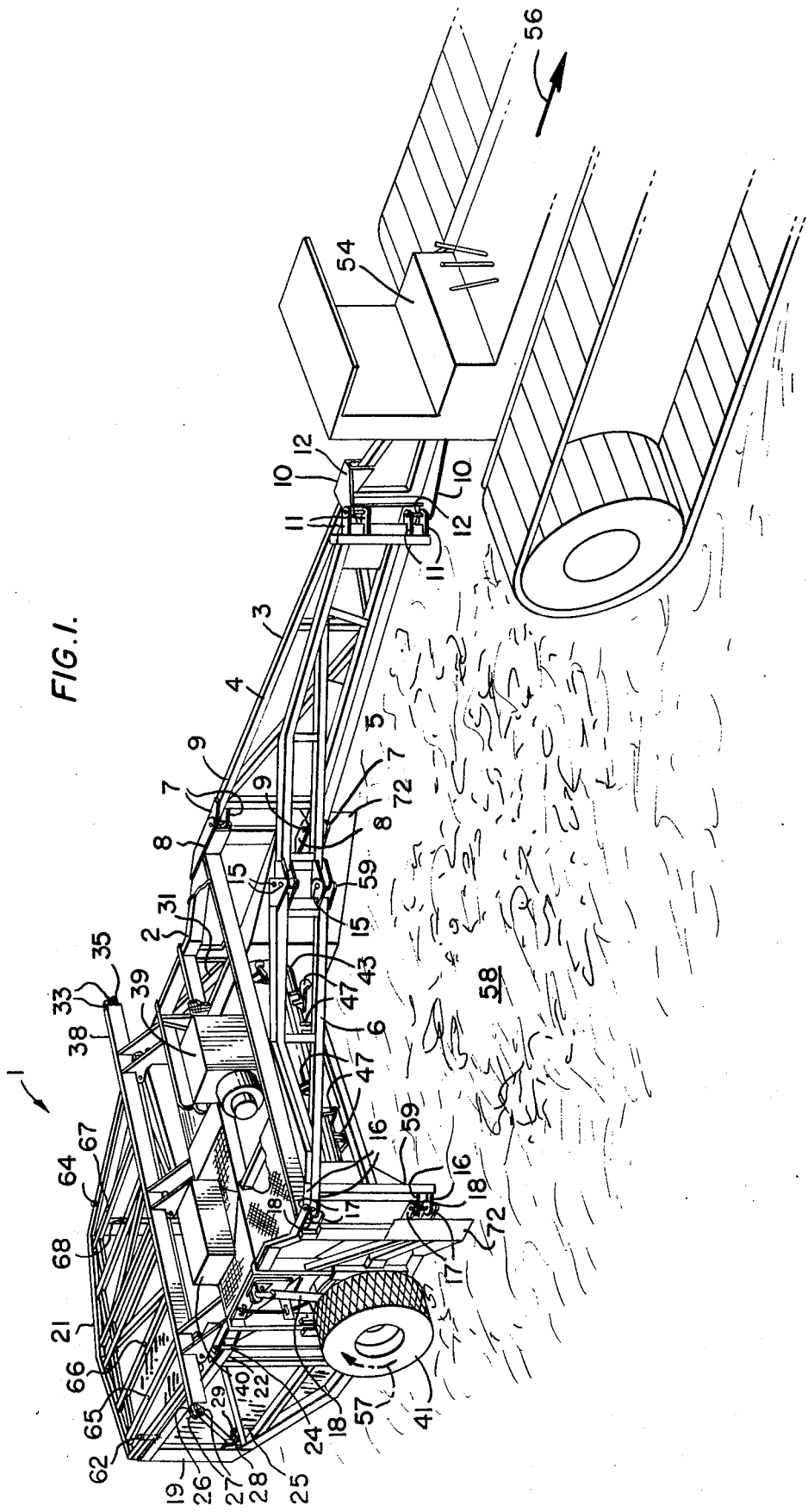
FIG. 1 shows a first embodiment of the compost machine of this invention.
Figure 2:
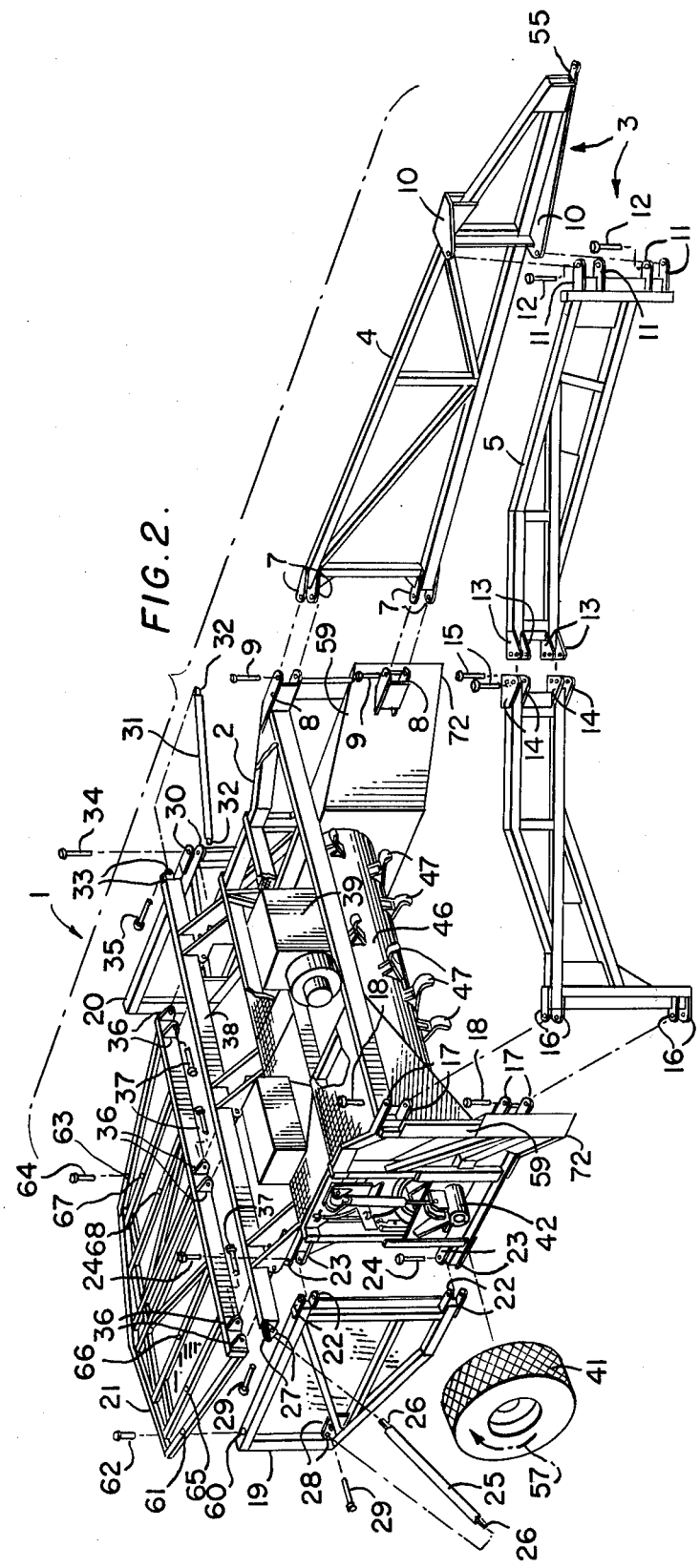
FIG. 2 shows the embodiment of FIG. 1 with various parts separated.

Referring to the drawing and specifically to FIGS. 1 and 2 which illustrate the first embodiment of the invention, the compost machine 1 of this first embodiment is a towed vehicle or implement having a frame assembly 2 and a tow bar 3. Tow bar 3 is made up from the three sections as units 4, 5 and 6. Section 4 of tow bar 3 is coupled to frame 2 by means of the coupler plates 7 at one end of section 4 and the coupler plates 8 covered by frame 2. Coupler plates 7 are aligned with coupler plates 8 and pins 9 (FIG. 2) are then dropped through the holes provided in coupler plates 7 and 8 to attach section 4 of tow bar 3 to frame 2. Pins 9 may be any suitable pin configuration that will mate with the holes in coupler plates and pivotally secure section 4 of tow bar 3 to frame 2. Generally retaining means such as cotter pins or the like will be used with pins 9 to prevent accidental dislodging of pins 9. Of course, in place of pins, nuts and bolts could be used. As will become apparent, additional pins are used in compost machine 1 to secure various parts together. In all cases, the pins may have any suitable configuration with suitable retaining means or instead of pins and retaining means, nuts and bolts may be used.

The front end of section 5 of tow bar 3 is pivotally secured to section 4 of tow bar 3 by means of the coupler plates 11 provided on the front end of section 5, the coupler plates 10 provided on section 4 adjacent the front end of section 4 and the pins 12. Section 5 of tow bar 3 is secured to section 6 of tow bar 3 by means of the coupler plates 13 provided on the rear end of section 5, the coupler plates 14 provided on the front end of section 6 and the pins 15. Coupler plates 13 and 14 each have a pair of holes and a pair of pins 15 is used with each set of coupler plates 13 and 15 to secure section 5 to section 6. In FIG. 1, to avoid cluttering only one pair of pins 15 is shown and in FIG. 2 only the heads of both pairs of pins 15 are clearly visible. Section 6 is secured to frame 2 by means of the coupler plates 16 provided at the rear end of section 6, the coupler plate 17 provided on frame 2 and the pins 18. The holes in coupler plates 16 are aligned with the holes in coupler plates 17 and the pins 18 are then slipped through these holes to secure section 6 to frame 2. Of course, suitable retaining means are provided with pins 18 to prevent accidental dislodging of pins 18.

The three adjustable folding protective shields 19, 20 and 21 are also secured to frame 2. Protective shield 19 is secured to frame 2 by means of the coupler plates 23 provided on frame 2 and the pins 24. The holes in coupler plates 22 are aligned with the holes in coupler plates 23 and pins 24 are dropped through the holes to secure protective shield 19 to frame 2. An adjustable cross-brace 25 is provided to hold the protective shield in either of two positions when it is secured to frame 2. Cross-brace 25 has a coupler projection 26 at each of its ends. Coupler projection 26 at the top of cross-brace 25 is slipped between coupler plate 27 provided on frame 2 and the hole in the coupler projection 26 is aligned with the hole in each of the coupler plates 27 so that the pin 29 can be slipped through the holes to secure cross-brace 25 to frame 2. Similarly, coupler projection 26 at the bottom end of cross brace 25 is slipped between the coupler plates 28 provided on protective shield 19 and the hole in the coupler projection is aligned with the hole in each of the coupler plates 28 so that the pin 29 can be slipped through these holes to secure cross-brace 25 to protective shield 19. The protective shield 20 provided on the other side of frame 2 is identically opposite to the protective shield 19 and is secured to frame 2 in the same manner that protective shield 19 is secured to frame 2. In FIG. 1, only the upper coupler plates 30 of protective shield 20 and the upper pin 34 provided to secure protective shield 20 to frame 2 are visible. Protective shield 20 is provided with lower coupler plates identical to lower coupler plates 22 of protective shield 19 and frame 2 is provided with upper and lower coupler plates identical to the coupler plates 23 associated with shield 19. Of course, a lower pin 34 is also provided. A cross-brace 31 identical to cross-brace 25 is also provided on this side of frame 2. Cross-brace 31 has a coupler projection 32 provided at each of its ends. The hole of the top coupler projection 32 of cross-brace 31 is slipped between the coupler plates 33 provided on this side of frame 2 and the hole in this coupler projection is aligned with the hole in each of the coupler plates 33 so that pin 35 can be slipped through these holes to secure cross-brace 31 to frame 2. Protective shield 20 is provided with a pair of coupler plates identical to coupler plates 28 of protective shield 19 and these coupler plates in combination with projection 32 at the bottom end of cross-brace 31 and a pin 35 are used to secure cross-brace 31 to protective shield 20. In other words, cross-brace 31 is secured to frame 2 and to protective shield 20 in the same manner that cross-brace 25 is secured to frame 2 and protective shield 19.

Figure 6:
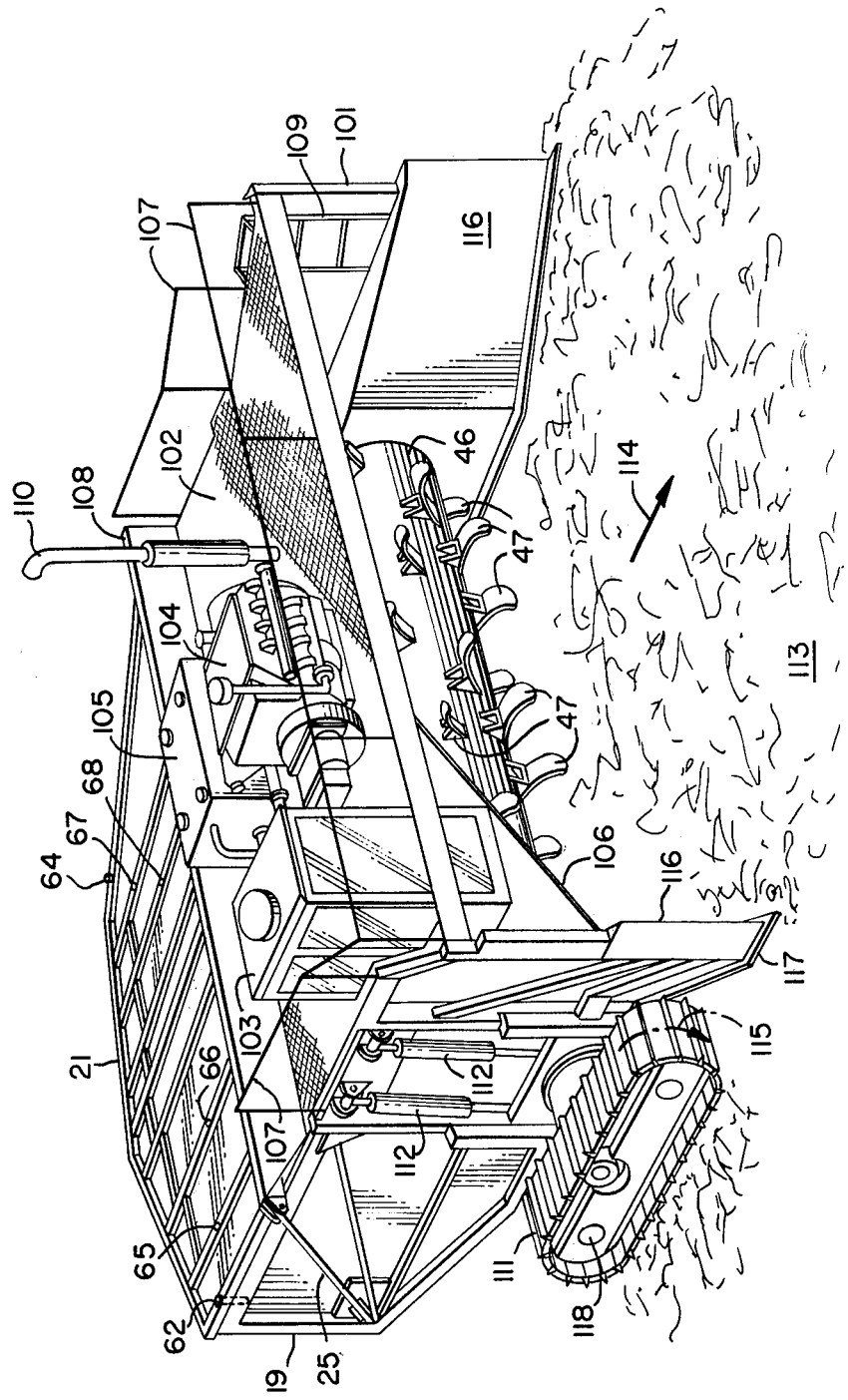
FIG. 6 shows a second embodiment of the invention.

Upper protective shield 21 has three pairs of coupler plates 36 provided on its forward edge. These coupler plates 36 mate with coupler plates provided on the bar 38 of frame 2. The coupler plates provided on the bar 38 are not visible in either FIG. 1 or 2. However, these coupler plates provided on bar 38 are similar to the coupler plates 36 of upper protective shield 21 and each coupler plate of bar 38 contains a hole which is aligned with the hole of the mating coupler plate 36 of upper protective shield 21 so that pins 37 can be slipped through the holes to secure upper protective shield 21 to frame 2. When protective shields 19, 20 and 21 are secured to frame 2 in the manner described above, one edge of protective shield 21 sits on the top edge of protective shield 19 and the opposite edge of protective shield 21 sits on the top edge of protective shield 20. While cross-brace 25 and cross-brace 31 tend to secure protective shields 19 and 20 in place, these shields are free to move inward and outward within the limits set by cross-braces 25 and 31. In order to firmly secure protective shield 19 so that protective shield 19 cannot move inward and outward, a hole 60 is provided in the top of protective shield 19, a mating hole 61 is provided in protective shield 21 and a pin 62 is also provided as shown in FIG. 2. When protective shields 19 and 21 are in place, as shown in FIGS. 1 and 6, holes 60 and 61 are aligned and pin 62 is dropped into these holes to lock protective shield 19 to protective shield 21. Similarly, a hole (not visible in the drawing) identical to hole 60 is provided in the top of protective shield 20 and a mating hole 63 is provided in protective shield 21. When protective shields 20 and 21 are in place, as shown in FIGS. 1 and 6, the hole in protective shield 20 is aligned with hole 63 of protective shield 21 and the pin 64 is dropped into these holes to lock protective shield 20 to protective shield 21. As is the case with the other pins described herein, pins 62 and 64 can be provided with cotter pins to hold them in place or pins 62 and 64 can be bolts with nuts provided to mate with the bolts.

As will become apparent, when compost machine 1 is in use, the compost material in the compost bed 58 is discharged between protective shields 19 and 20. In order to be able to vary this discharge opening, compost machine 1 will be provided with different length cross-braces 25 and 31 or cross-braces 25 and 31 can be fabricated as telescoping rods with locking means. As shown in the FIGS. 1, 2, 5 and 6, three different length cross-braces 25 and 31 can be used. That is, two sets of cross-braces longer than cross-braces 25 and 31 can be used. In order to accommodate these longer sets of cross-braces, protective shield 21 is provided with the additional holes 65, 66, 67 and 68. Hole 65 mates with hole 60 in protective shield 19 when a first longer cross-brace is substituted for cross-brace 25 and hole 66 mates with hole 60 when a second longer cross-brace is substituted for cross brace 25. The second longer cross-brace will, of course, be longer than the first longer cross-brace. Similarly, when a longer cross-brace is substituted for cross-brace 31, either hole 67 or 68 will mate with the hole in protective shield 20 that is identical to hole 60, depending upon which length cross-brace is substituted for cross-brace 31. Of course, as mentioned, cross-braces 25 and 31 could be adjustable to avoid the necessity of providing three separate sets of different length cross-braces. In any event, holes 61, 65, 66, 63, 67 and 68 provide a means of locking protective shields 19 and 20, respectively, to protective shield 21 in three different positions, thereby providing for varying the discharge opening between protective shields 19 and 20.

As the compost material of compost bed 58 is discharged between protective shields 19 and 20, pieces of this material will be propelled with considerable force, protective shields 19 and 20 protect against any material being propelled outward and protective shield 21 protects against any upward propelling of any material. However, the material can still be propelled backward between protective shields 19 and 20. To protect against this backward propelling of material, a flexible protective curtain 69 is provided. Protective curtain 69 is made of a plurality of shiplaped flexible curtain strips 71 that extend completely across the rear of protective shield 21. Curtain strips 71 may be secured to protective shield 21 by any suitable means that will permit these strips to swing freely. For example, a curtain rod 70 is secured to protective shield 21 and strips 71 are then secured to rod 70 by suitable curtain hangers. Note, in order to provide for the overlapping of curtain strips 71, rod 70 will either have to be a double rod arrangement or the curtain hangers used must be secured to strips 71 in such a manner as to permit the overlapping. In any event, precisely how curtain strips 71 are secured to protective shield 21 is a matter of design choice and any suitable securing means can be utilized. What ever means is used should permit strips 71 to move inward and outward; that is, to swing freely and should permit individual replacement of the strips 71 so that a damaged or worn out strip can be replaced. Curtain strips 71 not only protect against the backward propelling of material but also help contain dust, reduce noise and allow conformance to the cross section of processed composted discharge material.

Frame 2 also carries a prime mover 39 which may for example be an internal combustion engine. The fuel tank 40 is mounted on top of frame 2 in close proximity to prime mover 39. Fuel tank 40 is a two compartment fuel tank that carries fuel for prime mover 39 in one compartment and hydraulic fluid in its other compartment. The purpose of the hydraulic fluid will be described later. The actual physical connection between prime mover 39 and fuel tank 40 is not shown in FIGS. 1 and 2 since this connection is nothing more than a fuel line. Frame 2 further carries the required hydraulic circuit physical connections between hydraulic motors, actuators, control components, and pump-reservoir system.

Figure 4:
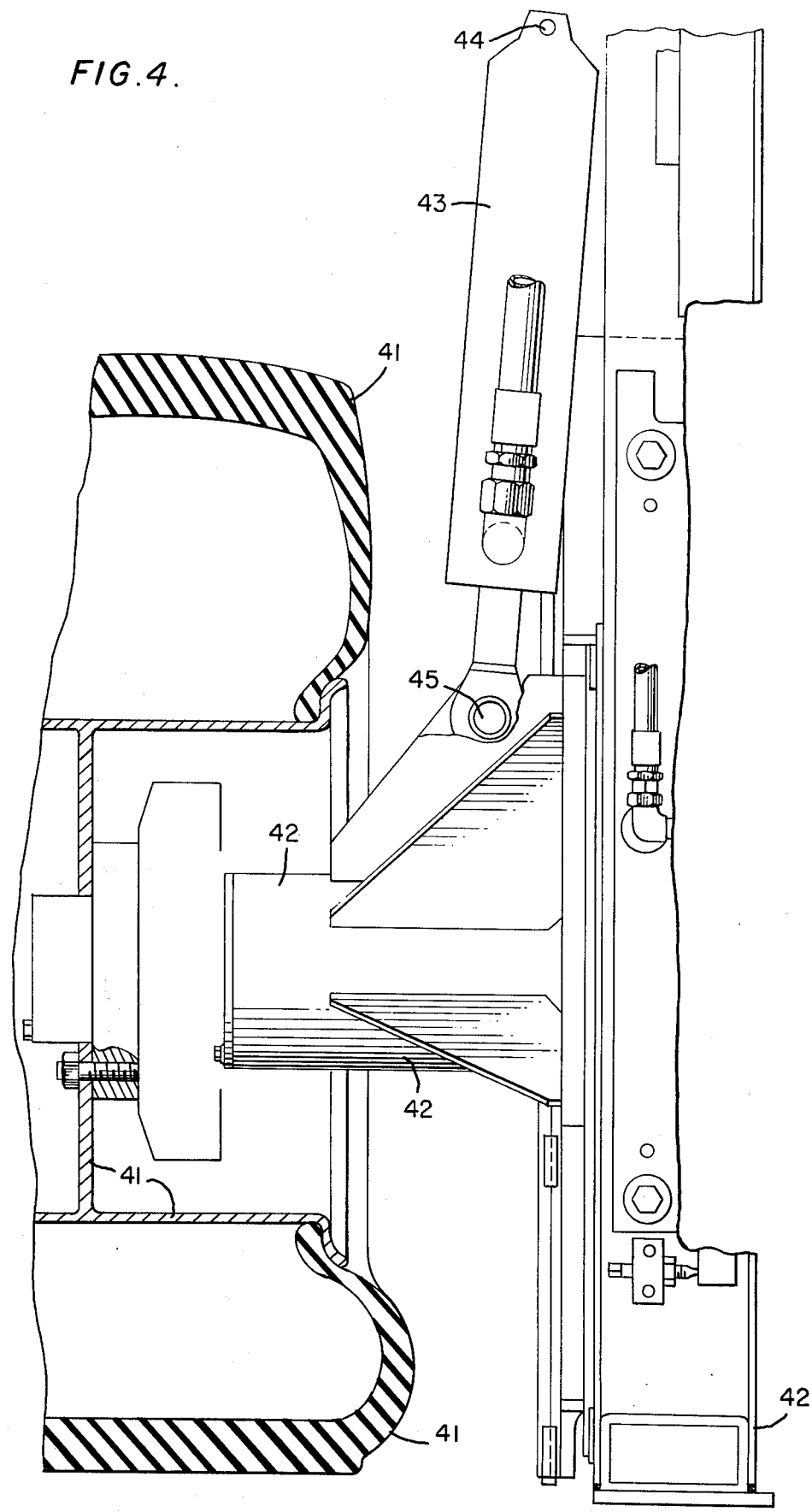
FIG. 4 is a partial section showing one of the wheel slide-track arrangements in place.

Frame 2 rides on two vertically adjustable sliders 42 each of which carries a rotatably mounted rubber tired wheel 41. FIG. 4 is a partial section showing one of the adjustable sliders 42 and its hydraulic linear actuator 43 secured to frame 2 by pin 44 and to wheel slider by pin 45. A second identically opposite adjustable slider and wheel assembly is mounted on the other side frame 2. For purposes of this invention, the hydraulic actuators are conventional hydraulic actuators driven by a conventional prime mover 39 and interconnected to prime mover 39 and hydraulic fluid tank 40 in a conventional manner. The purpose of the vertically adjustable wheel mount sliders is to provide for vertical movement of frame 2 on either or both sides and to provide for vertical adjustment of affixed rotary member 46. By means of this vertical adjustment frame 2 and rotary member 46 can be adjusted vertically to accommodate uneven terrain or heavy dense compost material. This vertical adjustment at either side of frame 2 is controlled at the operator's position of the towing vehicle 54 (FIG. 1) by means of conventional controls not shown in the drawing. As will become apparent, another important function of this vertical adjustment is to raise frame 2 when compost machine 1 is being loaded onto a truck trailer and then to lower frame 2 such that frame 2 and, therefore, compost machine 1 rests on the skids 72 of frame 2 instead of the rotatable wheels 41.

A cylindrical member 46 is rotatably mounted to frame 2. Cylindrical member 46 carries a plurality of teeth 47.

Figure 3:
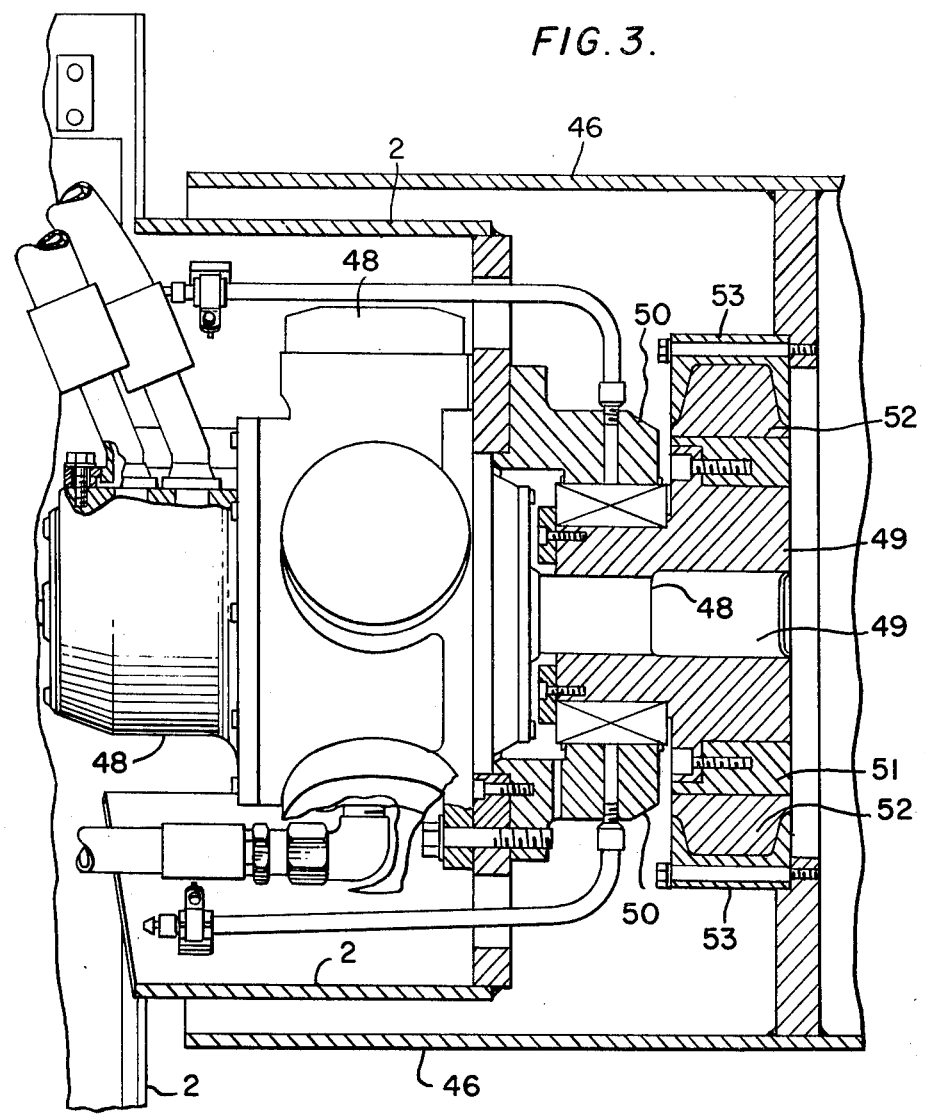
FIG. 3 is a partial section showing one of the hydraulic motor shock-protective-coupling arrangements mounted inside the rotary member.

A separate hydraulic motor shock protective coupling arrangement is provided inside each end of cylindrical member 46. FIG. 3 is a partial section showing one of the hydraulic motor shock-protective-coupling arrangements. A second identically opposite hydraulic motor shock-protective-coupling arrangement is mounted inside the other end of cylindrical member 46. The actual physical connection between hydraulic motor 48 and frame 2 is not shown in FIG. 3 since this connection does not form a part of the invention. For purposes of this invention hydraulic motor 48 and the hydraulic motor provided in the other end of cylindrical member 46 are conventional hydraulic motors driven by a conventional prime mover 39 and interconnected to prime mover 39 and hydraulic fluid tank 40 in a conventional manner. The rotary force produced by hydraulic motor 48 is transmitted to shaft adapter 49. Shaft adapter 49 is rotatably supported by housing-bearing-support assembly 50. The rotary force is transmitted to the inner member of shock-protective-coupling 51. The rotary force is transmitted through a force fitted elastomeric intermediate 52 to outer member, shock-protective-coupling 53. For purposes of this invention the shock-protective-couplings 51, 52 and 53 are conventional torsional vibration and shock-protection-couplings. The rotary force is transmitted from outer member, shock-protective-coupling 53 to cylindrical member 46. The invention features the arrangement of hydraulic motor 48, shaft adapter 49, housing-bearing-support assembly 50, and the conventional shock-protection-couplings 51, 52 and 53. The primary purpose of the hydraulic motor shock-protective-coupling arrangement is to prevent major shocks, caused by teeth 47 on cylindrical member 46 when impacting heavy dense objects, from being transmitted directly to hydraulic motors and secondarily to provide for vibration isolation, accommodation of misalignment, noise reduction, and long service life without maintenance.

When compost machine 1 is to be operated, sections 4, 5 and 6 of tow bar 3 are assembled as described above and protective shields 19, 20 and 21 are secured in place as described above. Of course, fuel for prime mover 39 is poured into the appropriate compartment of tank 40 and the hydraulic fluid level in tank 40 is checked, with fluid being added if necessary. Compost machine 1 is then coupled to a towing vehicle, such as the tractor 54 shown in FIG. 1. Tractor 54 is provided with a standard hitch which mates with the member 55 of tow bar 3 to secure compost machine 1 to tractor 54. Compost machine 1 is now ready for use. While tractor 54 is shown as a tracked vehicle, a wheeled vehicle may also be used as the towing vehicle.

When compost machine 1 is connected to towing vehicle 54 and is to be placed in operation, vehicle 54 is started and prime mover 39 is also energized. Prime mover 39 is energized by means of remote controls located at the operator's station of towing vehicle 54 and prime mover 39 and hydraulic motors 48 located inside cylindrical rotary member 46 are operated by means of remote controls also located at the operator's station of towing vehicle 54. The remote controls used to operate and control prime mover 39 and hydraulic motors 48 are not shown in the drawing since these controls are standard conventional controls. Depending upon the terrain and the density of the compost material in compost field 58, the operator may also adjust the vertical height of frame 2 on one or both sides by means of the vertically adjustable feature described above. As stated, the vertical adjustment of frame 2 is also accomplished by means of remote controls located at the operator's station of towing vehicle 54. Again, these controls are standard remote controls and are, therefore, not shown in any of the figures of the drawing.

After appropriate adjustments have been made to frame 2 and the apparatus is now ready to begin the composting operation, towing vehicle 54 pulls compost machine 1 in the direction of the arrow 56 in FIG. 1 and the hydraulic motors inside cylindrical rotary member 46 rotate cylindrical member 46 in the direction of the arrow 57 shown in FIGS. 1 and 2. As compost machine 1 moves through compost field 58, the compost material is guided to rotary cylindrical member 46 by means of the fixed guide or side plates 59 of frame 2. The rotation of rotary cylindrical member 46 causes teeth 47 to shred and aerate the material in compost field 58.

The fact that rotary cylindrical member 46 is powered by hydraulic motors, the direction of rotation of rotary cylindrical member 46, the shape of teeth 47 with respect to the direction of rotation of cylindrical member 46 and the direction of travel of towing vehicle 54 are significant features of this invention. Due to the direction of rotation of cylindrical member 46 and the shape of teeth 47, the hydraulic motors inside cylindrical member 46 not only rotate cylindrical member 46 but also impart a propelling force in the direction of travel of compost machine 1. Referring to FIGS. 1 and 2, it can be seen that teeth 47 impact the material in compost field 58 and propel the material toward the rear of compost machine 1; the equal but opposite force acts to propel compost machine 1 in the direction of travel thereby assisting towing vehicle 54 in the propelling of compost machine 1 through compost field 58. Thus, cylindrical member 46 and teeth 47 not only shred and aerate the material of compost field 58 but also assist to propel compost machine 1. This feature of the invention renders compost machine 1 suitable for large scale operation.

Another important feature of this invention is the fact that compost machine 1 can be readily loaded onto a standard truck-trailer and transported from one location to another distant location. The conventional prior art compost machines require disassembly and special truck-trailers to transport them from one location to another location.

When compost machine 1 is to be transported to a new location, cross-braces 25 and 31 and pins 62 and 64 are removed, and then protective shields 19 and 20 are folded inward against frame 2. Upper protective shield 21 is then lowered down against shields 19 and 20 since protective shield 21 is now free to pivot on pins 37 used to secure protective shield 21 to frame 2. Curtain strips 71 or curtain rod 70 can be removed, but since these strips are flexible, they are preferably merely pushed under frame 2 after compost machine 1 is loaded on the truck-trailer.

Tow bar 3 is also collapsed when compost machine 1 is transported. Tow bar 3 is collapsed by removing lockpins and folding sections 4, 5 and 6. First one of each of the pair of pins 15 used to secure section 5 to section 6 is removed. Section 4 is then pivoted back toward frame 2 on pins 9. As section 4 swings back toward frame 2, section 6 also pivots back toward frame 2 on pins 18 while section 5 folds alongside section 6 by pivoting on the remaining one of each of the pair of pins 15 with section 4 folding alongside section 5. In other words, sections 4, 5 and 6 pivot on their various pins to permit tow bar 3 to collapse against the front of frame 2. With protective shields 19, 20 and 21 collapsed against the rear of frame 2 and with tow bar 3 collapsed against the front of frame 2, the overall length of compost machine 1 is substantially reduced. In this reduced size, compost machine 1 can be transported on a conventional truck-trailer. Further, it can be so transported without being disassembled. The conventional prior art compost machines must be disassembled to some extent in order to transport them from site to site and even after this disassembly a special vehicle is needed to transport these prior art compost machines from site to site.

The vertical adjustment feature of frame 2 also assists in the loading, unloading and transporting of compost machine 1. When compost machine 1 is to be loaded onto a truck-trailer, the tow bar and protective shields are collapsed as described above, frame 2 is raised to its highest lever and then loaded onto the truck-trailer by means of a ramp for example. With frame 2 raised to its highest point, frame 2 and rotary cylindrical member 46 will clear the ramp and trailer bed. In other words, only the rubber tired wheels 41 will touch the ramp and truck-trailer, thereby permitting compost machine 1 to be easily rolled up the ramp and onto the truck-trailer by means of the wheels. When compost machine 1 is on the truck-trailer, frame 2 is lowered such that the skids 72 of frame 2 rest on the truck-trailer. With the skids 72 resting on the truck-trailer, compost machine 1 will not roll off the truck-trailer and will, in fact, tend to be held on the truck-trailer by its own weight. As an extra safety measure, compost machine 1 will, of course, be tied down; however, the chance that compost machine 1 will topple off the truck-trailer when it rests on skids 72 is remote. However, an abrupt stop by the truck transporting compost machine 1 might cause it to shift and, therefore, it will normally be tied down even though it is resting on its skids 72. After frame 2 is lowered onto skids 72, curtain strips 71 can be pushed under frame 2 toward cylindrical member 46 if these strips have not been removed.

After compost machine 1 arrives at its new location, frame 2 is again raised to its highest level and compost machine 1 is rolled off of the truck-trailer by means of a ramp, for example. Protective shield 21 is then raised and protective shields 19 and 20 are pivoted outward. Cross-braces 25 and 31 are then secured to frame 2 and to protective shields 19 and 20, respectively, and pins 62 and 64 are dropped in place. Tow bar 3 is also unfolded and the one pin removed from each pair of pins 15 is replaced to lock tow bar 3 in place. Thus, compost machine 1 by this relatively simple process of unfolding the various folded parts is quickly placed in condition for use at the new site. With the exception of the removal of cross-braces 25 and 31 and the removal of four pins, compost machine 1 is loaded onto a truck-trailer, transported to a new site, unloaded from the truck-trailer and placed in operating condition in a relatively short period of time because of the fact that compost machine 1 need not be disassembled and then reassembled at the new site. Of course, tow bar 3 and protective shields 19, 20 and 21 could be completely disassembled for transport and then reassembled at the new location; however, this would require more time than is needed to fold protective shields 19, 20 and 21 and tow bar 3, and would represent an unnecessary waste of time in most, if not all, cases.

In FIGS. 1 and 2, the pins utilized to couple the tow bar components and protective shields are all shown as being relatively short pins that are just long enough to pass through a mating set of coupler plates. However, where various coupler plates are in line, a long pin can be used instead of the individual short pins shown. For example, pins 9 could be replaced by a single long pin that would extend through both the upper and lower coupler plates 7 of section 4 and the upper and lower coupler plates 8 of frame 2. Similarly, pins 12, 15, 18, etc., could all be replaced by long pins. However, the shorter pins shown are more convenient to work with and are therefore preferred.

Figure 5:
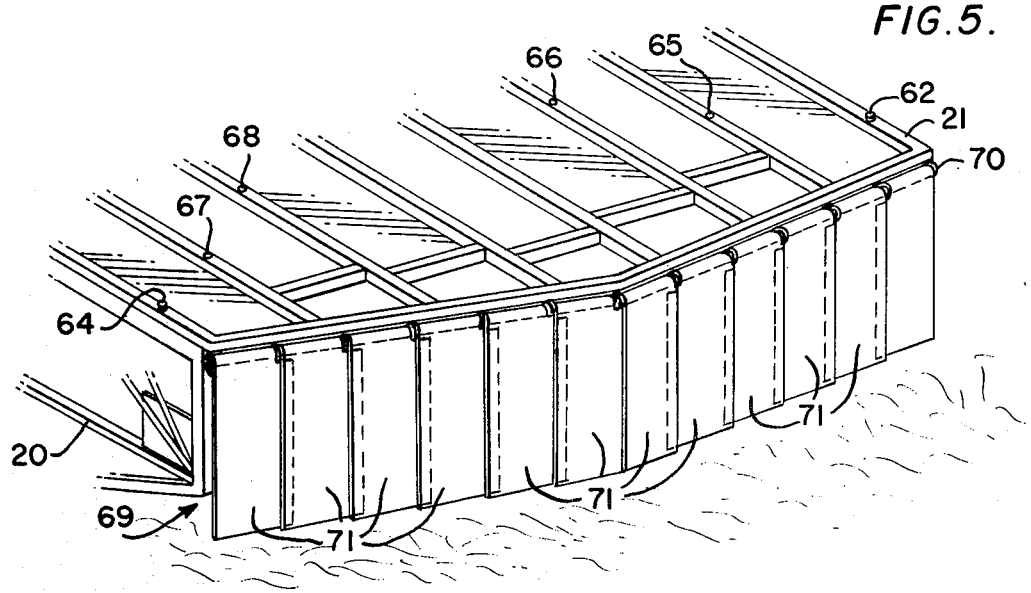
FIG. 5 shows a part of the upper protective shield and the protective strip curtain attached to the upper protective shield.

FIG. 6 shows the second embodiment of the compost machine of this invention. Instead of being a towed vehicle, compost machine 100 of FIG. 6 is a self propelled vehicle. However, many of the components of compost machine 100 are identical to the equivalent components of compost machine 1 and where identical components are present these components have the same numerals in FIG. 6 as they do in FIGS. 1 and 2 in order to illustrate the identity of components. Machine 100 has an upper protective shield 21, a side protective shield 19 has a protective shield 20 equivalent to protective shield 20 is also provided with compost machine 100; this protective shield 20 is not visible. A cross-brace 25 is provided with protective shield 19 and a cross-brace 31, not visible in FIG. 6, is provided with a protective shield 20. In other words, the protective shield arrangement of compost machine 100 is identical to the protective shield arrangement of compost machine 1. In addition, compost machine 100, as does compost machine 1, includes the rotary cylindrical member 46 having a plurality of teeth 47. Compost machine 100 further includes a frame 101 that is similar but not identical to frame 2. The protective shields 19, 20 and 21 and cross-braces 25 and 31 are all interconnected to each other and to frame 101 in the same manner that these shields are interconnected to each other and frame 2 of compost machine 1. Therefore, the foregoing description of these elements with reference to compost machine 1 applies to the protective shield arrangment of compost machine 100 and, therefore, a detailed description of these shields and the pin arrangements for compost machine 100 should not be necessary since such a detailed description would merely be repetitious. Further, the protective curtain arrangement shown in FIG. 5 is also provided with protective shield 21 of compost machine 100. Rotary cylindrical member 46 of compost machine 100 is identical to rotary cylindrical member 46 of compost machine 1 and is secured to frame 101 in the same manner that cylindrical member 46 is secured to frame 2. Further, a hydraulic motor 48 is also provided inside each end of cylindrical member 46 of compost machine 100. Therefore, FIG. 4 also illustrates the inside of cylindrical member 46 of compost machine 100 and the preceeding description of FIG. 4 and the shock protective coupling arrangement with reference to compost machine 1 also applies to compost machine 100. In summary, the shield arrangement, the manner in which the protective shields are interconnected and secured to the frame, the rotary cylindrical member, the hydraulic motor structure inside the rotary cylindrical member and the shock mounting of the hydraulic motors of compost machine 100 and compost machine 1 are identical.

Beyond the foregoing enumerated identical elements of compost machine 100 and compost machine 1, compost machine 100 differs in structure from compost machine 1; however, except for the self-propelled feature of compost machine 100, compost machine 100 and compost machine 1, as will become apparent, operate is essentially the same manner.

In addition to the structural elements described above, compost machine 100 includes a deck 102 mounted on the front top part of frame 101. A prime mover 104 and a fuel and hydraulic fluid tank 105 are mounted to deck 102. One corner of deck 102 is cut away and a part of the operator cab 103 fits down into this cut away portion of deck 102 with the balance of operator cab 103 extending above deck 102. The bottom of operator cab 103 rests and is preferably secured to a plate 106 that is secured to frame 101. A guard rail 107 is secured to both sides and the front of deck 102 and a guard plate 108 is provided at the rear of deck 102. A ladder 109 is secured to one side of frame 101. A break in the guard rail 107 is provided by ladder 109. Ladder 109 is, of course, used to permit easy access to deck 102. Note the embodiment of FIGS. 1 and 2 (compost machine 1) does not include an equivalent ladder; however, such a ladder could be conveniently provided with compost machine 1. An exhaust stack 110 which is the exhaust for prime mover 104 extends above deck 102.

Instead of rubber tired wheels, compost machine 100 is provided with a pair of conventional track assemblies 111, one flexibly mounted on each side of frame 101. Only one of the track assemblies is visible in FIG. 6; both assemblies are identical. The track assemblies 111 are standard conventional track assemblies and are driven by the hydraulic motors 118 mounted inside each track assembly 111. Hydraulic motors 118 are controlled or driven by prime mover 104. Track assemblies 111 may be any suitable conventional track assemblies and the hydraulic fluid and drive system used to drive track assemblies 111 are conventional systems. Therefore, the various interconnections and structural details of track assemblies 11 and the drive system are not shown in the drawing. Track assemblies and hydraulic drive systems for track assemblies are old and well known.

Track assemblies 111 of compost machine 100 are vertically adjustable in the same manner that wheel assemblies 41 of compost machine 1 are adjustable. However, instead of using a single hydraulic cylinder, a pair of hydraulic cylinders or actuators 112 provide the vertical adjustment of track assemblies 111. Only one pair of the hydraulic cylinders 112 are visible. An identical pair of such cylinders are provided on the other side of frame 101. FIG. 3 shows the vertical slider assembly of tired wheels 41 of compost machine 1. Except for the fact that a pair of flexibly mounted hydraulic cylinders 112 are used with track assemblies 111, and except for some minor structural differences necessitated by the use of track assemblies 111, the mounting of track assemblies 111 is similar to the wheel mounting assembly shown in FIG. 3. Hydraulic actuators 112 are powered by prime mover 104 through the hydraulic system. The hydraulic system interconnections to operate hydraulic actuators 112 are conventional and well known; therefore, a detailed showing of the hydraulic system and connections to actuators 112 is not shown.

Prime mover 104 and the hydraulic system of compost machine 100 are controlled from operator cab 103. Standard controls are utilized and are, therefore, not shown. Fuel and hydraulic fluid tank 105 is a multi-compartment tank that contains fuel for prime mover 104 and hydraulic fluid for the hydraulic system of compost machine 100. The interconnections of fuel tank 105 and prime mover 104 and the hydraulic system are also not shown in detail in the drawing since these interconnections are conventional, well known interconnections. Operator cab 103 is merely a standard booth or cab having a door or opening not visible in FIG. 6 and having glass or transparent panels on all sides to give the operator maximum visibility. Of course, instead of a closed housing a standard tractor seat could be provided.

Compost machine 100 is shown in FIG. 6 as being located in a compost field 113 and is used to shred and aerate the compost material of compost field 113. When compost machine 100 is to be operated, the operator climbs up ladder 109 and enters cab 103. By means of the controls located in cab 103, the operator starts prime mover 104 and, if necessary, vertically adjusts either one or both of the track assemblies. Track assemblies 111 are vertically adjusted to compensate for any unevenness in the terrain of compost field 113 and to raise rotary cylindrical member 46, if the material of compost field 113 is a heavy dense material.

After making any necessary vertical adjustments, the operator energizes the hydraulic system to propel compost machine 100 forward in the direction of arrow 114, and to rotate rotary member 46. Rotary member 46 rotates in the direction of arrow 115. As compost machine 100 moves forward through compost field 113, the compost material is directed or guided toward cylindrical member 46 by means of the guide plates 116 of frame 101. Teeth 47 shred, mix and aerate the compost material which after shredding, mixing and aerating is, due to the direction of rotation of cylindrical member 46 and the shape of teeth 47, discharged out of the back of compost machine 100 between the side protective shields. As is the case with compost machine 1, the protective shield arrangement of compost machine 100 prevents the propelling of compost material upward and outward. In addition, since the protective strip curtain of FIG. 5 is also preferably used with compost machine 100, compost material will not be propelled out of the back of compost machine 100 and noise and dust will be kept at a minimum.

As teeth 47 impact the material of compost field 113 and propel the material out between the side protective shields, an equal but opposite force is applied to compost machine 100. This equal and opposite force tends to propel compost machine 100 in a forward direction, arrow 114, thereby assisting the drive system to propel compost machine 100 through the compost field. As is the case with compost machine 1, the fact that teeth 47 together with rotary cylindrical member 46 help propel compost machine 100 through the compost field is a significant feature of the invention and render compost machine 100 suitable for large scale operation.

Compost machine 100 is shown as having track assemblies to propel the compost machine. Due to the nature of the material in compost fields, tracks are generally more suitable than wheels; however, two pair of the rubber tired wheels 41 of compost machine 1 could be substituted for the track assemblies 111. Of course, in compost machine 100 the wheels would be driven and skid steered by conventional means.

As is the case with compost machine 1, compost machine 100 is readily loaded onto, unloaded from the transported by a conventional truck-trailer. No special truck is required to transport compost machine 100 from one location to another distant location. To transport compost machine 100, the protective shield arrangement is collapsed and folded in the identical manner that the protective shield arrangement of compost machine 1 is collapsed and folded. This folding of the protective shields is fully described above in the description of compost machine 1. Frame 101 is then raised to its highest level by means of the vertical adjustment provided by hydraulic cylinders 112. Compost machine 100 is then loaded onto the truck-trailer by, for example, driving compost machine 100 up a ramp onto the truck-trailer. Since compost machine 100 can actually be driven up the ramp and onto the truck-trailer because it is self-propelled, compost machine 1 is somewhat easier to load onto a truck-trailer than is compost machine 1.

After compost machine 100 is loaded onto the truck-trailer, frame 101 is lowered so that compost machine 100 rests on the skids 117 of frame 101. Resting compost machine 100 on skids 117 helps hold compost machine 100 on the truck-trailer. After frame 101 is lowered such that skids 117 rest on the truck-trailer, curtain strips 71 of protective curtain 69, if this protective curtain is provided, are pushed under the back of compost machine 100 toward cylindrical member 46 or, if desired, curtain strips 71 can be removed before the protective shields are folded.

Operator cab 103 protrudes above the rest of compost machine 100 by a considerable extent as does exhaust 110. In order to reduce the overall height of compost machine 100 during transport, operator cab 103 can be detached from plate 106, if it is secured to plate 106, and laid on its side on the truck-trailer or on compost machine 100. if this is to be the manner in which operator cab 103 is to be transported, operator cab 103 will be secured to plate 106 in such a manner that it is readily attached and detached. For example, pins or nuts and bolts could be used to secure operator cab 103 to plate 106. Of course, when operator cab 103 is removed, it will have to be lifted over the controls located inside operator cab 103. Instead of totally removing operator cab 103, the cab can be fabricated such that the upper part of the cab can be collapsed to bring cab 103 down onto deck 102 or to a level no higher than the highest permanently secured part. For example, the frame and transparent plate could be hinged at some level below the top of cab 103 but above deck 102 so that this upper part of the cab could be folded downward or the frame members of cab 103 could be telescoping members and the transparent plates around the cab could be split and so constructed that the upper part of cab 103 could be telescoped down into the lower part during transportation. A hinge arrangement or telescoping arrangement would be preferable to total removal of operator cab 103. However, precisely how operator cab 103 is lowered for transport is a matter of choice and any conventional system that will permit the height of operator cab 103 to be readily and easily raised and lowered may be used. Further, operator cab 103 can be eliminated completely with only a seat being provided by the controls, thereby eliminating problems of cab height.

The exhaust system 110 can easily be lowered by fabricating the exhaust system as a two piece system in which the two parts are hinged on one edge, adjacent the top of deck 102. If exhaust system 110 is so fabricated, the upper of the two parts would merely be folded and laid on deck 102 and preferably tied down.

While operator cab 103 will normally be constructed such that it is foldable or easily removed from its mounting and exhaust system 110 will also normally be constructed such that is can readily by reduced in height, it will not always be necessary to reduce the height of compost machine 100 when it is being transported. If the route being taken to transport compost machine 100 does not have any underpasses or other overhead obstacles such as low hanging wires, operator cab 103 and exhaust system 110 will not have to be reduced in height.

After compost machine 100 has been loaded onto the truck-trailer as described above, it is ready to be transported to the new location. When compost machine 100 arrives at its new location, frame 101 is raised to its highest position by means of hydraulic actuators 112 and is then driven off the truck-trailer by means of a ramp or the like and the protective shields are unfolded and secured in the manner previously described with reference to compost machine 1. In addition, before unloading, operator cab 103 and exhaust system 110 are erected if these elements were reduced in height. Compost machine 100 is now ready for use at the new site. Thus, it is apparent that compost machine 100 is readily transported from one site to another distant site with the loading and unloading process taking but a relatively short period of time.

While the invention has been described with reference to two specific embodiments, it will be apparent to those skilled in the art that various modifications can be made to the embodiments shown as described without departing from the spirit and scope of the invention as set forth in the claims.

I claim:

1. A compost machine comprising:
    a frame having a first side, a second side, a front, a back and a top;
    a first protective shield pivotally secured to said first side of said frame at said back of said frame;
    a second protective shield pivotally secured to said second side of said frame at said back of said frame;
    a third protective shield pivotally secured across said back of said frame, said first, second and third protective shields being pivotally secured to said first side, said second side and across said back of said frame, respectively, in such a manner that said first, second and third protective shields can be folded over said back of said frame to reduce the overall length of said frame;
    first ground engaging and motion translating means;
    means to secure said first ground engaging and motion translating means to said first side of said frame;
    second ground engaging and motion translating means;
    means to secure said second ground engaging and motion translating means to said second side of said frame;
    a cylindrical member;
    means to secure said cylindrical member between said first side and said second side of said frame;
    means to provide rotary motion to said cylindrical member; and
    a plurality of spaced apart teeth secured to the outside of said cylindrical member.

2. A compost machine as defined in claim 1 wherein one edge of said third protective shield rests on the top edge of said first protective shield and the opposite edge of said third protective shield rests on the top edge of said second protective shield when said first, second and third protective shields are in their operative state.

3. A compost machine as defined in claim 2 wherein means are provided to secure said third protective shield to said first and second protective shields when said first, second and third protective shields are in said operative state.

4. A compost machine as defined in claim 3 further comprising: a first cross brace having one end secured to said first protective shield and its opposite end secured to said frame, and a second cross brace having one end secured to said second protective shield and its opposite end secured to said frame.

5. A compost machine as defined in claim 4 wherein said means to secure said first ground engaging and motion translating means to said first side of said frame includes first means to adjust the height of said frame relative to said first ground engaging and motion translating means, and wherein said means to secure said second ground engaging and motion translating means to said second side of said frame includes second means to adjust the height of said frame relative to said second ground engaging and motion translating means, said first and second means to adjust the height of said frame being operable independently of each other.

6. A compost machine as defined in claim 5 wherein said means to provide rotary motion to said cylindrical member includes a first hydraulic motor mounted inside one end of said cylindrical member and a second hydraulic motor mounted inside the other end of said cylindrical member.

7. A compost machine as defined in claim 6 further comprising a prime mover secured to said top of said frame.

8. A compost machine as defined in claim 7 wherein said first ground engaging and motion translating means comprises a first tired wheel and said second ground engaging and motion translating means comprises a second tired wheel.

9. A compost machine as defined in claim 8 further comprising a foldable tow-bar secured to said front of said frame.

10. A compost machine as defined in claim 9 wherein said foldable tow-bar comprises a first section pivotally secured to said first side of said frame at said front of said frame, a second section pivotally secured to said second side of said frame and a third section pivotally secured to said first and second sections of said tow-bar.

11. A compost machine as defined in claim 10 wherein said first section, said second section and said third section of said tow-bar and pivotally secured to said first side of said frame, said second side of said frame and to said first and second sections of said tow-bar, respectively, in such a manner that said tow-bar is foldable against said front of said frame to reduce the overall length of said compost machine.

12. A compost machine as defined in claim 11 wherein said prime mover is coupled to first and second hydraulic motors to drive said first and second hydraulic motors.

13. A compost machine as defined in claim 12 wherein a plurality of strip curtains are secured to said third protective shield at the top back edge of said third protective shield, said plurality of curtain strips being arranged such that each one of said plurality of strip curtains overlaps the adjacent one of said plurality of strip curtains and being so arranged that said plurality of curtain strips extend from the said third protective shield to the ground across the back of said third protective shield.

14. A compost machine as defined in claim 13 wherein said second section of said tow-bar includes means to secure said tow-bar to a towing vehicle.

15. A compost machine as defined in claim 14 wherein said first and second protective shields define a compost discharge area and wherein means are provided to adjust the distance between said first and second shields when said first and second shields are in said operative state to thereby adjust the size of said discharge area.

16. A compost machine as defined in claim 15 wherein said plurality of teeth are so shaped that said plurality of teeth in combination with said cylindrical member assist in the propelling of said compost machine in a forward direction when said cylindrical member is driven by said hydraulic motors.

17. A compost machine as defined in claim 16 wherein said first hydraulic motor and said second hydraulic motor are both shock mounted inside said cylindrical member.

18. A compost machine as defined in claim 7 wherein said first ground engaging and motion translating means comprises a first track assembly and said second ground engaging and motion translating means comprises a second track assembly.

19. A compost machine as defined in claim 18 wherein said prime mover is coupled to said first and second hydraulic motors to drive said first and second hydraulic motors.

20. A compost machine as defined in claim 19 wherein said prime mover is coupled to said hydraulic motors and said hydraulic motors are coupled to said first track assembly and said second track assembly to drive said first and second track assemblies to thereby propel said compost machine.

21. A compost machine as define in claim 20 wherein a plurality of strip curtains are secured to said third protective shield at the top back edge of said third protective shield, said plurality of curtain strips being arranged such that each one of said plurality of strip curtains overlaps the adjacent one of said plurality of strip curtains and being so arranged that said plurality of curtain strips extend from the said third protective shield to the ground across the back of said third protective shield.

22. A compost machine as defined in claim 19 wherein said first and second protective shields define a compost discharge area and wherein means are provided to adjust the distance between said first and second shields when said first and second shields are in said operative state to thereby adjust the size of said discharge area.

23. A compost machine as defined in claim 22 wherein said plurality of teeth are so shaped that said plurality of teeth in combination with said cylindrical member assist in the propelling of said compost machine in a forward direction when said cylindrical member is driven by said hydraulic motors.

24. A compost machine as defined in claim 1 further comprising a foldable tow-bar secured to said front of said frame.

25. A compost machine as defined in claim 4 wherein said foldable tow-bar comprises a first section pivotally secured to said first side of said frame at said front of said frame, a second section pivotally secured to said second side of said frame and a third section pivotally secured to said first and second sections of said tow-bar.

26. A compost machine as defined in claim 25 wherein said first section, said second section and said third section of said tow-bar are pivotally secured to said first side of said frame, said second side of said frame and to said first and second sections of said tow-bar, respectively, in such a manner that said tow-bar is foldable against said front of said frame to reduce the overall length of said compost machine.

27. A compost machine as defined in claim 26 wherein said second section of said tow-bar includes means to secure said tow-bar to a towing vehicle.

* * * * *